No. 12,520. REISSUED AUG. 14, 1906.

V. E. EDWARDS.

CONVEYER FOR METAL BARS.

APPLICATION FILED JUNE 8, 1906.

2 SHEETS—SHEET 1.

Witnesses

Roy D. Tolman.

Penelope Comberbach.

Inventor

Victor E. Edwards.

By Rufus B. Fowler

Attorney

No. 12,520. REISSUED AUG. 14, 1906.

V. E. EDWARDS.

CONVEYER FOR METAL BARS.

APPLICATION FILED JUNE 8, 1906.

2 SHEETS—SHEET 2.

Witnesses
Roy D. Tolman.
Penelope Comberbach.

Inventor
Victor E. Edwards.
By Rufus B. Fowler
Attorney

UNITED STATES PATENT OFFICE.

VICTOR E. EDWARDS, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

CONVEYER FOR METAL BARS.

No. 12,520. Specification of Reissued Letters Patent. Reissued Aug. 14, 1906.

Original No. 793,926, dated July 4, 1905. Application for reissue filed June 8, 1906. Serial No. 320,891.

*To all whom it may concern:*

Be it known that I, VICTOR E. EDWARDS, a citizen of the United States, residing at Worcester, in the county of Worcester and Commonwealth of Massachusetts, have invented a new and useful Improvement in Conveyers for Metal Bars, of which the following is a specification accompanied by drawings forming a part of the same, in which—

Figure 1:
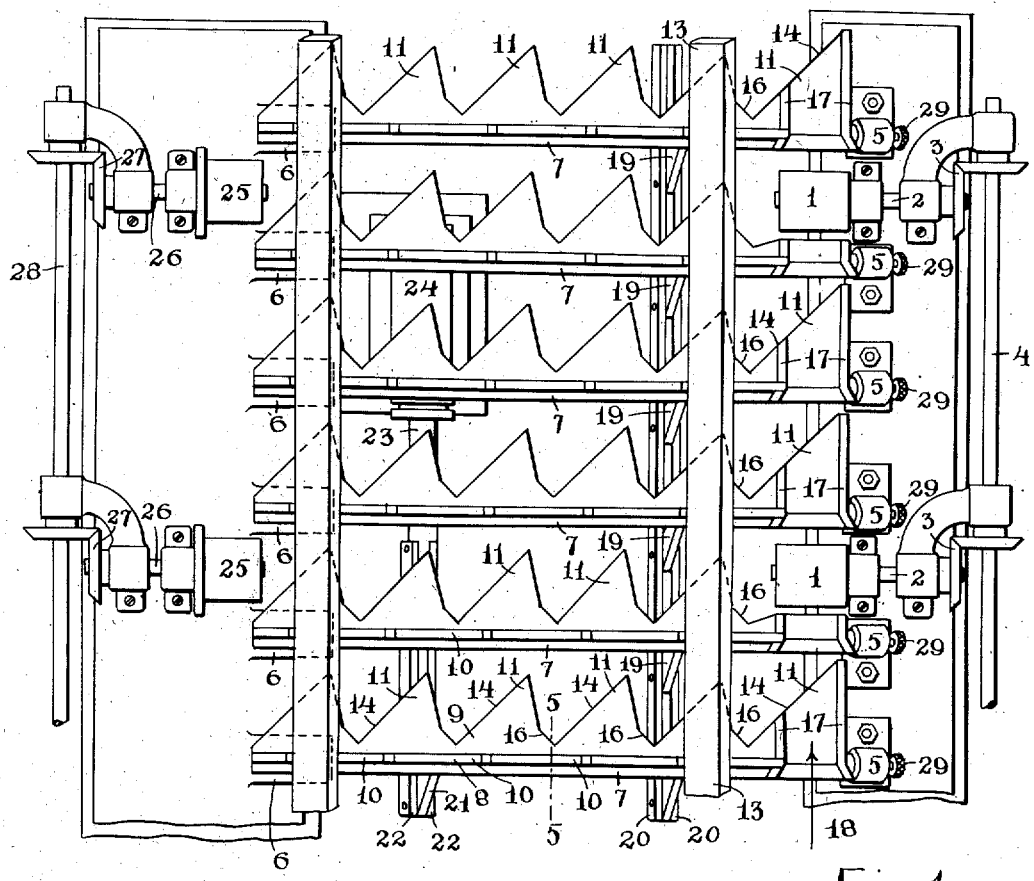
Figure 2:
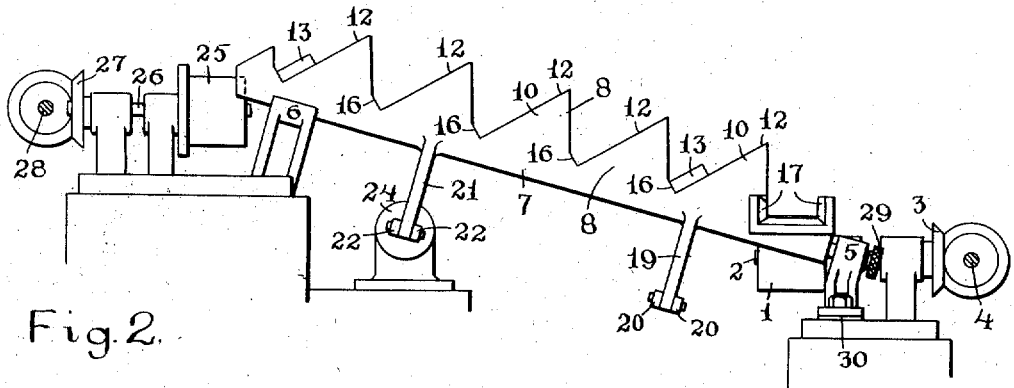
Figure 5:
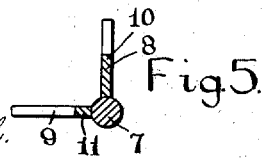
Figure 3:
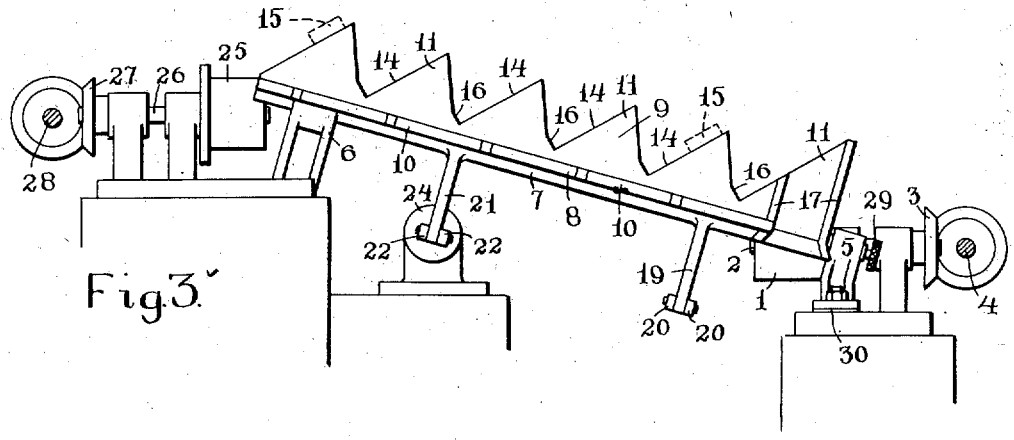
Figure 4:
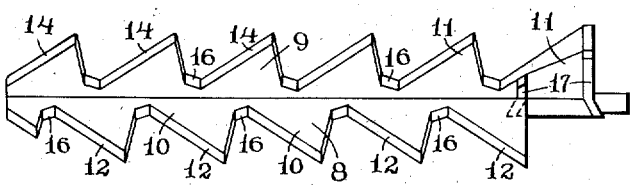
Figure 6:
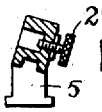
Figure 7:
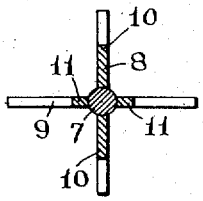

Figure 1 represents a plan view of a conveyer for metal bars embodying my invention. Fig. 2 is a side view showing the position of the conveyer to receive a metal bar. Fig. 3 is a side view showing the position of the conveyer when rocked to raise a metal bar. Fig. 4 is a detached view of one of the rocking notched conveyer-bars. Fig. 5 is a transverse sectional view of one of the notched conveyer-bars on line 5 5, Fig. 1. Fig. 6 is a sectional view of one of the bearings of the notched conveyer-bars, showing the adjusting-screw for adjusting the position of the bar. Fig. 7 is a sectional view of a conveyer-bar, showing a modified form.

Similar reference-figures refer to similar parts in the different views.

My present invention relates to a conveyer for conveying metal bars, preferably from a lower to a higher plane; and it consists in the construction and arrangement of parts, as hereinafter described, and pointed out in the annexed claims.

Referring to the accompanying drawings, 1 1 denote a pair of conveyer-rolls carried on shafts 2 2 and driven by miter-gears 3 from a common driving-shaft 4.

Journaled in bearings 5 6 in vertical planes parallel with the axes of the shafts 2 are the inclined rocking bars 7. Each of the rocking bars 7 is provided with radial notched blades 8 and 9, arranged at right angles to each other. The blade 8 is provided with notches to form triangular teeth 10 and the blade 9 is similarly notched to form triangular teeth 11. The bars 7 are held in their bearings 5 and 6 in an inclined position, as represented in Figs. 2 and 3, and the triangular teeth 10 are provided with inclined sides 12, the inclination of which is greater than the coefficient of friction, so that a metal bar supported on the triangular teeth 10 near their apex will slide by gravity to the bottom of the notch in the position represented by the bars 13 13, Fig. 2. Similarly the triangular teeth 11 are provided with inclined sides 14, on which a metal bar when supported near the top of the teeth, as represented at 15 15, Fig. 3, will be caused to slide by gravity to the bottom of the notches. Whenever a bar has been caused to slide by gravity from the top to the bottom of one of the triangular teeth, it will be brought into contact with surfaces 16 at right angles to the inclined surfaces 12 and 14 of the triangular teeth. The lowermost triangular tooth 11 of each of the rocking bars 7 receives the bar in a horizontal position and is provided with guides 17 17 to conduct the bar by a longitudinal movement in the direction of the arrow 18, Fig. 1, across the conveyer, the longitudinal movement of the bar being facilitated by the rotating rolls 1 1. Each of the rocking conveyer-bars 7 is provided with an arm 19, and these arms are pivotally connected by links 20 20, and the first rocking conveyer-bar 7 in the series is also provided with a radial arm 21, which is connected by links 22 22 with a piston-rod 23, which is reciprocated by a hydraulic cylinder 24, having the usual valve connections (not shown) to enable the movement of the rocking bars to be controlled by the operator. When a metal bar has been entered across the conveyer-bars in the guides 17, power is applied to the hydraulic cylinder to rock the conveyer-bars 7 one-quarter turn, which will raise the teeth 11 from a horizontal to a vertical plane, which will lift the bar off the rolls 1 and out of the guides 17 and cause it to be supported upon the inclined surfaces 14 of the teeth 11 and near the apex of the teeth. The bar on entering the guides 17 possesses considerable motion in the direction of the arrow 18 as a result of its contact with the rolls 1, and it is necessary that this motion should be stopped before the bar enters upon its transverse movement across the conveyer. As the teeth 11 are rocked and the bar is lifted off the conveyer-rolls 1 before the bar has progressed entirely across the conveyer-bars, the longitudinal motion of the bar is gradually checked by its friction with the teeth 11, and as it is no longer in contact with the rolls 1 it gradually comes to a stop and is then ready for its transverse movement across the conveyer. I thus accomplish the gradual checking of the longitudinal movement of the bar without imparting to it any sudden end blow or stop which in the red-hot and hence plastic condition of a bar of considerable length would bend or buckle it. The teeth 11 between the guides 17 therefore perform the function of gradually stopping the longitudinal motion of the metal bar without possibility of an end blow, and I am enabled to lift the bar off the conveyer-rolls while the bar is in motion and to stop this motion without buckling the bar. The side of the teeth 11 next the conveyer-bars 7 overlap their axes of rotation, and the teeth are rocked in a direction against the longitudinal movement of the bar during the operation of lifting the bar from the conveyer-rolls, so that the teeth as they are rocked from their normal horizontal position to a vertical position furnish inclined surfaces to receive the end of the bar in its longitudinal movement and guide it to the highest edge of the plate, thereby preventing the catching or sudden arrest of the forward end of the rod in its progress across the conveyer-bars in the guides 17 and the consequent bending or buckling of the rod in its soft condition. As the teeth 11 are rocked and the bar is lifted on the inclined surface 14 of said teeth the guides 17 on the teeth 11, nearer the hot-bed, are brought below the plane of the bar, and hence the bar will slide on the sides 14 until it strikes the surfaces 16. The apices of the triangular teeth 10 are arranged in planes midway between the apices of the triangular teeth 11, so that when the bar has slid to the bottom of the first set of teeth 11 at the lower end of the conveyer-bars 7 and the conveyer-bars 7 are rocked in the opposite direction one-quarter turn, thereby bringing the triangular teeth 10 from a horizontal to a vertical plane, the metal bar is lifted by and supported upon the inclined sides 12 of the teeth 10, upon which the bar slides into the position shown by the bar 13 in Figs. 1 and 2. The rocking motion of the conveyer-bars 7 is then continued, causing the metal bar to be alternately supported first by one set of teeth 10 and then by the other set of teeth 11, with a period between each alternate rocking of the conveyer-bars to allow the metal bar to slide down the inclined sides of the triangular teeth, and this operation is repeated until the metal bar has been moved along the conveyer-bars 7 by a step-by-step movement, each successive step causing the metal bar to be raised to a higher level, due to the inclination of the conveyer-bars 7. When the metal bar has thus been traversed with a step-by-step movement the entire length of the conveyer-bars 7, it will be finally delivered upon a pair of conveyer-rolls 25 25, carried upon shafts 26 26 and driven by miter-gears 27 from a common driving-shaft 28, allowing the metal bar to be removed by a longitudinal movement of the conveyer, the difference in the level between the conveyer-rolls 1 and the conveyer-rolls 25 corresponding to the elevation of the metal bar by the successive lifting movement of the conveyer-bars 7. Each of the conveyer-bars 7 is longitudinally adjustable in its bearings 5 and 6 by means of an adjusting-screw 29, bearing against the lower end of the conveyer-bar, thereby enabling the conveyer-bars to be accurately adjusted, so as to bring the lifting-teeth of one bar in alinement with the corresponding lifting-teeth of the remaining bars, so that the inclined sides 12 and 14 of each set of teeth 10 and 11 will lie in the same plane when brought into action to support a metal bar, and the surfaces 16, which serve as stops to limit the movement of the bar, when actuated by gravity will also lie in the same plane, so that when the bar has slid by gravity down the inclined sides of the triangular teeth and been brought forcibly against the stop-surfaces 16 the supporting-surfaces of the metal bar being in alinement will serve to straighten the bar.

In addition to the longitudinal adjustment of the conveyer-bars 7 by the adjusting-screws 29 I also provide for the vertical adjustment of one of the bearings 5 by means of a removable plate or shim 30, which can be exchanged for one of different thickness, as may be required to raise or lower the bearing.

I do not claim, broadly, the employment of rocking conveyer-bars having projecting teeth, as such a conveyer was shown in Letters Patent of the United States No. 701,024, issued to me May 27, 1902. In the above patent, however, the projecting arms of the inclined skids served only as stops to check the downward movement of a metal bar along the skids, while in my present invention the inclined sides of the teeth form ways along which the metal bar is moved by gravity, and the inclined sides of one row or set of teeth is made to overlap the inclined sides of the adjacent row or set of teeth.

Although I have shown my invention in Figs. 1 to 3 of the accompanying drawings as embodied in a conveyer in which the rocking conveyer-bars are inclined and adapted to raise a metal bar from a lower to a higher plane, I do not confine myself, however, to the use of inclined bars, as it is obvious that the movement of a metal bar in a line parallel with the axes of the rocking conveyer-bars would be accomplished if the conveyer-bars were to be journaled in bearings in a horizontal plane or if the delivery end of the bars were lower than the receiving end.

In the conveyer illustrated in the accompanying drawings the different series of teeth 10 and 11 are alternately brought into position to support the metal by a rocking motion imparted to the conveyer-bars 7; but by arranging the teeth as shown in Fig. 7, with the series of teeth 10 and 11 alternating around the conveyer-bar 7, it will be obvious that a rotary motion could be imparted to the conveyer-bar 7 by any known means with the same result—viz., that of bringing the different series of teeth 10 and 11 into action alternately.

The teeth 11, provided with guides 17, form movable supporting-surfaces for the metal bars between the conveyer-rolls, and by lifting these supporting-surfaces the frictional checking of the longitudinal movement of the bars is accomplished without danger of a sudden interference with the end of the rod. This lifting of these supporting-surfaces to engage the bar upon their inclined sides 14 also accomplishes the removal from the transverse path of the bar of the guides 17 between the longitudinal conveyer and the hot-bed.

What I claim as my invention, and desire to secure by Letters Patent, is—

1. In a conveyer for metal bars, the combination of a series of conveyer-bars, teeth projecting from said bars and having inclined sides and arranged in alternating rows or series, with the inclined sides of the teeth in one series overlapping the inclined sides of the teeth in the next adjacent series, and means for bringing the different series successively into supporting relation to a metal bar held thereon.

2. In a conveyer for metal bars, the combination with a series of journaled conveyer-bars having parallel axes and capable of a simultaneous intermittent rotary movement about their axes, of teeth projecting from said conveyer-bars and arranged in two rows or series, said teeth having inclined sides arranged to form ways for the sliding movement of a metal bar supported thereon, with the inclined sides of one series of teeth overlapping the inclined sides of the adjacent series.

3. In a conveyer for metal bars, the combination of a series of conveyer-bars, teeth projecting from said bars and having inclined sides forming ways for a metal bar sliding thereon by gravity, and a series of stops at the base of said inclined sides, said stops being in alinement, whereby a metal bar is straightened by its impact against said stops.

4. In a conveyer for metal bars, the combination of two notched plates presenting inclined sides to support a metal bar, with the angle of their inclination greater than the angle of friction and having the inclined sides of one of said notched plates overlapping the inclined sides of the other plate, and means for alternately bringing the two plates into supporting relation to a metal bar extending transversely across said plates, whereby the metal will be advanced broadside.

5. In a conveyer for metal bars, the combination with two sets of notched plates forming teeth having inclined sides constituting ways for the sliding movement of a metal bar by gravity, stops at the base of said inclined ways, means for bringing said stops into alinement to straighten the metal bar, and means for bringing the sets of notched plates alternately into supporting relation to a metal bar held thereon.

6. In a conveyer for metal bars, the combination with a journaled conveyer-bar having teeth arranged in two sets or rows, of guides for the longitudinal movement of a metal bar across said conveyer-bar, said guide being supported on one of said teeth, and means for imparting an intermittent rotary motion to said conveyer-bar about its axis.

7. In a conveyer for metal bars, the combination with a series of journaled conveyer-bars, teeth projecting from said conveyer-bars and having inclined sides forming ways for a metal bar moved by gravity on said inclined sides, of means for moving a metal bar lengthwise across said conveyer-bars, and comprising a series of guides supported on the teeth of said journaled conveyer-bars.

8. In a conveyer for metal bars, the combination with a notched plate forming teeth, of a guide for the longitudinal movement of a metal bar across said notched plate, said guide being supported on one of said teeth, said tooth having an inclined side arranged to be brought into contact with the metal bar by a rocking movement of the notched plate, whereby the metal bar is raised out of said guide and means for rocking said plate.

9. In a conveyer for metal bars, the combination with a series of conveyer-bars journaled in bearings and having inclined axes, of teeth projecting from said conveyer-bars and arranged in sets or rows and having inclined sides with the inclined sides of one set overlapping the inclined sides of the next adjacent set, and means for imparting an intermittent rotary movement to said conveyer-bars to bring said sets of teeth alternately into supporting relation to a metal bar extending across said conveyer-bars, whereby the metal bar is advanced broadside from one vertical level to another.

10. In a conveyer for metal bars, the combination with a series of conveyer-bars journaled in bearings, teeth projecting from said conveyer-bars, guides for the longitudinal movement of a metal bar across said conveyer-bars, said guides being supported on the teeth of said conveyer-bars, means for rocking said conveyer-bars, and conveyer-rolls intervening between said guides.

11. In a conveyer for metal bars, the combination with conveyer-rolls of supporting-surfaces for a metal bar between said conveyer-rolls, and means for imparting a rocking motion to said bar-supporting surfaces about an axis at an angle to the longitudinal movement of the metal bar, whereby said bars are lifted off said rolls, and guides on said supporting-surfaces to limit the sidewise movement of the metal bar toward the cooling-bed.

12. In a conveyer for metal bars, the combination with conveyer-rolls, of supporting-surfaces for a metal bar between said conveyer-rolls, a guide on each supporting-surface for the longitudinal movement of a metal bar across said supporting-surfaces, and means for imparting a lifting movement to said bar-supporting surfaces, whereby said bar is lifted off said rolls and clear of said guide.

13. In a conveyer for metal bars, the combination with a series of conveyer-rolls, for imparting a longitudinal movement to the bar, of lifting-surfaces between said conveyer-rolls, and means for rocking said lifting-surfaces from a horizontal to a vertical position in a direction opposite to the longitudinal movement of the bar during the operation of lifting the bar from the conveyer-rolls.

14. In a conveyer for metal bars, the combination with a series of conveyer-rolls for imparting a longitudinal movement to the bar, of lifting-surfaces between said conveyer-rolls lying normally in a horizontal position, and means for rocking said lifting-surfaces into a vertical position and in a direction opposite to the longitudinal movement of the bar on said rolls, said lifting-surfaces having one of their edges overlapping their axes of rotation.

15. In a conveyer for metal bars, the combination with conveyer-rolls, of lifting-surfaces between said conveyer-rolls, guides on said lifting-surfaces for the longitudinal movement of said bar across said surfaces, and means for rocking said lifting-surfaces in a direction opposite to the longitudinal movement of the bar.

16. In a conveyer for metal bars, the combination with conveyer-rolls and conveyer-bars, of supporting-surfaces for a metal bar between said conveyer-rolls, guides on said supporting-surfaces for the longitudinal movement of a metal bar across said supporting-surfaces, and means for removing the guides between said supporting-surfaces and said conveyer-bars out of the path of said metal bar onto said conveyer-bars.

17. In a conveyer for metal bars, the combination with conveyer-rolls, of supporting-surfaces for a metal bar between said conveyer-rolls, guides on said supporting-surfaces for the longitudinal movement of a metal bar across said supporting-surfaces, and means for rocking said supporting-surfaces, whereby the metal bar is lifted above the plane of said guides.

VICTOR E. EDWARDS.

Witnesses:

PENELOPE COMBERBACH.
RUFUS B. FOWLER.